(12) United States Patent
Wang et al.

(10) Patent No.: US 10,901,598 B2
(45) Date of Patent: Jan. 26, 2021

(54) METHOD FOR ADJUSTING INTERFACE SCROLLING SPEED, RELATED DEVICE, AND COMPUTER PROGRAM PRODUCT

(71) Applicant: HUAWEI TECHNOLOGIES CO., LTD., Guangdong (CN)

(72) Inventors: Quanxin Wang, Shenzhen (CN); Guilei Lv, Xi'an (CN); Nana Pang, Xi'an (CN); Xiaowei Ma, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/499,071

(22) PCT Filed: Aug. 2, 2017

(86) PCT No.: PCT/CN2017/095634
§ 371 (c)(1),
(2) Date: Sep. 27, 2019

(87) PCT Pub. No.: WO2018/176711
PCT Pub. Date: Oct. 4, 2018

(65) Prior Publication Data
US 2020/0042162 A1 Feb. 6, 2020

(30) Foreign Application Priority Data

Mar. 29, 2017 (CN) .......................... 2017 1 0198380

(51) Int. Cl.
*G06F 3/0484* (2013.01)
*G06F 3/0485* (2013.01)
(Continued)

(52) U.S. Cl.
CPC ........ *G06F 3/04847* (2013.01); *G06F 3/0485* (2013.01); *G06F 3/0488* (2013.01);
(Continued)

(58) Field of Classification Search
None
See application file for complete search history.

(56) References Cited

U.S. PATENT DOCUMENTS 8,686,944 B1 4/2014 Charlton et al.
2010/0235794 A1 9/2010 Ording
(Continued)

FOREIGN PATENT DOCUMENTS

CN 103365577 A 10/2013
CN 103838510 A 6/2014
(Continued)

*Primary Examiner* — Brian M Butcher
(74) *Attorney, Agent, or Firm* — Womble Bond Dickinson (US) LLP

(57) ABSTRACT

A method for adjusting an interface scrolling speed, a terminal, a storage medium, and a computer program product are disclosed. The method includes: obtaining a sliding operation performed by a user on a touchscreen, determining a type of the user based on a sliding speed of the sliding operation, increasing an interface scrolling speed, when the type of the user is a user that operates a mobile phone fast, decreasing the interface scrolling speed, when the us type of the user is a user that operates a mobile phone slowly, recording an interface scrolling speed parameter, adjusting a scrolling speed of an interface based on the interface scrolling speed parameter.

12 Claims, 8 Drawing Sheets

(51) Int. Cl.
*G06F 3/0488* (2013.01)
*H04M 1/725* (2006.01)
(52) U.S. Cl.
CPC .... *H04M 1/72569* (2013.01); *H04M 2201/42* (2013.01); *H04M 2250/12* (2013.01)

(56) References Cited

U.S. PATENT DOCUMENTS

| | | | |
|---|---|---|---|
| 2011/0265039 A1 | 10/2011 | Lyon et al. | |
| 2012/0256967 A1* | 10/2012 | Baldwin | G06F 3/0485 345/684 |
| 2014/0191948 A1* | 7/2014 | Kim | G06F 3/012 345/156 |
| 2016/0078848 A1* | 3/2016 | Tanaka | G06F 3/013 345/684 |
| 2016/0110046 A1 | 4/2016 | Yao | |

FOREIGN PATENT DOCUMENTS

| | | |
|---|---|---|
| CN | 104038834 A | 9/2014 |
| CN | 104216625 A | 12/2014 |
| CN | 104636048 A | 5/2015 |
| CN | 105122200 A | 12/2015 |
| CN | 105718173 A | 6/2016 |
| WO | 2014075553 A1 | 5/2014 |

\* cited by examiner

METHOD FOR ADJUSTING INTERFACE SCROLLING SPEED, RELATED DEVICE, AND COMPUTER PROGRAM PRODUCT

CROSS-REFERENCE TO RELATED APPLICATIONS

This application is a National Stage of International Application No. PCT/CN2017/095634, filed on Aug. 2, 2017, which claims priority to Chinese Patent Application No. 201710198380.8, filed on Mar. 29, 2017, both of which are hereby incorporated by reference in their entireties.

TECHNICAL FIELD

Embodiments of the invention belong to the field of terminal technologies, and relate to a method for adjusting an interface scrolling speed, a related device, and a computer program product.

BACKGROUND

When a user uses a terminal device including a touchscreen, interface scrolling display may be triggered by performing a sliding operation on the touchscreen or in another manner. In the prior art, there is a fixed association relationship between a sliding speed of a user and a scrolling speed of an interface. Interface scrolling sensitivity is considered by users as one manifestation of terminal performance. Different groups of users have different requirements on an interface scrolling speed. However, in the prior art, an interface scrolling speed cannot be adjusted based on a user requirement.

SUMMARY

Embodiments of this application provide a method for adjusting an interface scrolling speed, to resolve a prior-art technical problem in which an interface scrolling speed cannot be adjusted based on a user requirement. The embodiments of this application further provide a corresponding terminal, a storage medium, and a computer program product.

A first aspect of this application provides a method for adjusting an interface scrolling speed, and the method includes:

obtaining a user operation, determining an interface scrolling speed parameter based on the user operation, and adjusting a scrolling speed of an interface based on the interface scrolling speed parameter. It can be learned from the first aspect that, according to the method for adjusting an interface scrolling speed provided in the first aspect of this application, the user operation can be obtained, the interface scrolling speed parameter is determined based on the user operation, and the scrolling speed of the interface is further adjusted based on the interface scrolling speed parameter, so that the interface scrolling speed parameter and the interface scrolling speed can be adjusted based on the user operation. Further, different users can determine appropriate interface scrolling speeds through different user operations, so that the user can adjust an interface scrolling speed as required.

With reference to the first aspect, in one embodiment, the user operation is a sliding operation performed by a user on a touchscreen, and the determining an interface scrolling speed parameter based on the user operation includes:

obtaining a reference user sliding speed, a reference interface scrolling speed, and a sliding speed of the sliding operation, where the reference user sliding speed and the reference interface scrolling speed are preset; and determining the interface scrolling speed parameter based on the sliding speed and the reference user sliding speed. It can be learned from the first aspect that, the interface scrolling speed parameter can be dynamically determined based on the sliding speed of the user on the touchscreen during sliding of the user on the touchscreen.

With reference to the first aspect, in one embodiment, the user operation is selection from interface scrolling speed options, and the determining an interface scrolling speed parameter based on the user operation includes:

obtaining an interface scrolling speed option selected by a user, determining a reference user sliding speed and a reference interface scrolling speed that correspond to the interface scrolling speed option selected by the user, and using a ratio of the reference interface scrolling speed to the reference user sliding speed as the interface scrolling speed parameter. It can be learned from the first aspect that, the user can actively select a required interface scrolling speed by using the interface scrolling speed option, so that different requirements of the user are met.

With reference to one embodiment, the adjusting a scrolling speed of an interface based on the interface scrolling speed parameter includes:

obtaining a sliding speed of a sliding operation performed by the user on a touchscreen, multiplying the sliding speed by the interface scrolling speed parameter to obtain an adjusted interface scrolling speed, and adjusting the scrolling speed of the interface based on the adjusted interface scrolling speed. It can be learned from the first aspect that, an interface scrolling speed can be adjusted based on a dynamically adjusted interface scrolling speed parameter, in other words, the interface scrolling speed can be dynamically adjusted based on the sliding operation of the user.

With reference to the first aspect, in one embodiment, the user operation is a sliding operation performed on a touchscreen after selection from interface scrolling speed options, and the determining an interface scrolling speed parameter based on the user operation includes:

obtaining an interface scrolling speed option selected by a user, determining a reference user sliding speed and a reference interface scrolling speed that correspond to the interface scrolling speed option selected by the user, obtaining a sliding speed of the sliding operation, and determining the interface scrolling speed parameter based on the sliding speed and the reference user sliding speed. It can be learned from the first aspect that, the user can perform selection based on a requirement on an interface scrolling speed, and then the interface scrolling speed parameter can be dynamically adjusted based on the sliding speed of the user, so that the interface scrolling speed can be adaptively adjusted better.

In one embodiment, the determining the interface scrolling speed parameter based on the sliding speed and the reference user sliding speed includes:

determining a ratio of the sliding speed to a reference sliding speed as a correction coefficient, calculating a central value of the correction coefficient, and determining the central value of the correction coefficient as the interface scrolling speed parameter. It can be learned from the first aspect that, the interface scrolling speed parameter can be determined through a plurality of sliding operations, thereby improving accuracy of determining the interface scrolling speed parameter.

In one embodiment, the adjusting a scrolling speed of an interface based on the interface scrolling speed parameter includes:

multiplying the interface scrolling speed parameter by the reference interface scrolling speed to obtain an adjusted interface scrolling speed, and adjusting the scrolling speed of the interface based on the adjusted interface scrolling speed. It can be learned the first aspect that, the adjusted interface scrolling speed can be determined based on the scrolling speed parameter, so that user requirements for different interface scrolling speeds can be met.

In one embodiment, the interface scrolling speed options include an option of identifying an interface scrolling speed by using text and/or an option of identifying an interface scrolling speed by using an interface scrolling effect. It can be learned from the first aspect that, the interface scrolling speed options can be displayed in different forms, so that the user can more intuitively select a required interface scrolling speed.

A second aspect of this application provides a terminal, and the terminal includes:

an obtaining unit, configured to obtain a user operation;

a determining unit, configured to determine an interface scrolling speed parameter based on the user operation; and an adjustment unit, configured to adjust a scrolling speed of an interface based on the interface scrolling speed parameter.

In one embodiment, the user operation is a sliding operation performed by a user on a touchscreen, and the determining unit is configured to:

obtain a reference user sliding speed, a reference interface scrolling speed, and a sliding speed of the sliding operation, where the reference user sliding speed and the reference interface scrolling speed are preset; and determine the interface scrolling speed parameter based on the sliding speed and the reference user sliding speed.

In one embodiment, the user operation is selection from interface scrolling speed options, and the determining unit is configured to:

obtain an interface scrolling speed option selected by a user; and determine a reference user sliding speed and a reference interface scrolling speed that correspond to the interface scrolling speed option selected by the user, and use a ratio of the reference interface scrolling speed to the reference user sliding speed as the interface scrolling speed parameter.

In one embodiment, the adjustment unit is configured to:

obtain a sliding speed of a sliding operation performed by the user on a touchscreen;

multiply the sliding speed by the interface scrolling speed parameter to obtain an adjusted interface scrolling speed; and adjust the scrolling speed of the interface based on the adjusted interface scrolling speed.

In one embodiment, the user operation is a sliding operation performed on a touchscreen after selection from interface scrolling speed options, and the determining unit is configured to:

obtain an interface scrolling speed option selected by a user;

determine a reference user sliding speed and a reference interface scrolling speed that correspond to the interface scrolling speed option selected by the user;

obtain a sliding speed of the sliding operation; and determine the interface scrolling speed parameter based on the sliding speed and the reference user sliding speed.

In one embodiment, the determining unit is further configured to:

determine a ratio of the sliding speed to a reference sliding speed as a correction coefficient, calculate a central value of the correction coefficient, and determine the central value of the correction coefficient as the interface scrolling speed parameter.

In one embodiment, the adjustment unit is configured to:

multiply the interface scrolling speed parameter by the reference interface scrolling speed to obtain an adjusted interface scrolling speed; and adjust the scrolling speed of the interface based on the adjusted interface scrolling speed.

In one embodiment, the interface scrolling speed options include an option of identifying an interface scrolling speed by using text and/or an option of identifying an interface scrolling speed by using an interface scrolling effect.

For beneficial effects of all parts of the second aspect, refer to descriptions in the first aspect. Details are not described herein again.

A third aspect of this application provides a terminal, and the terminal includes:

a processor and a memory, where the memory stores a computer instruction, and when the computer instruction in the memory is executed, the processor is configured to perform the following operations:

obtaining a user operation;

determining an interface scrolling speed parameter based on the user operation; and adjusting a scrolling speed of an interface based on the interface scrolling speed parameter.

With reference to the third aspect, in one embodiment, the user operation is a sliding operation performed by a user on a touchscreen, and the determining an interface scrolling speed parameter based on the user operation includes:

obtaining a reference user sliding speed, a reference interface scrolling speed, and a sliding speed of the sliding operation, where the reference user sliding speed and the reference interface scrolling speed are preset; and determining the interface scrolling speed parameter based on the sliding speed and the reference user sliding speed.

In one embodiment, the user operation is selection from interface scrolling speed options, and the determining an interface scrolling speed parameter based on the user operation includes:

obtaining an interface scrolling speed option selected by a user;

determining a reference user sliding speed and a reference interface scrolling speed that correspond to the interface scrolling speed option selected by the user; and using a ratio of the reference interface scrolling speed to the reference user sliding speed as the interface scrolling speed parameter.

In one embodiment, the adjusting a scrolling speed of an interface based on the interface scrolling speed parameter includes:

obtaining a sliding speed of a sliding operation performed by the user on a touchscreen;

multiplying the sliding speed by the interface scrolling speed parameter to obtain an adjusted interface scrolling speed; and adjusting the scrolling speed of the interface based on the adjusted interface scrolling speed.

In one embodiment, the user operation is a sliding operation performed on a touchscreen after selection from interface scrolling speed options, and the determining an interface scrolling speed parameter based on the user operation includes:

obtaining an interface scrolling speed option selected by a user;

determining a reference user sliding speed and a reference interface scrolling speed that correspond to the interface scrolling speed option selected by the user;

obtaining a sliding speed of the sliding operation; and determining the interface scrolling speed parameter based on the sliding speed and the reference user sliding speed.

In one embodiment, the determining the interface scrolling speed parameter based on the sliding speed and the reference user sliding speed includes:

determining a ratio of the sliding speed to a reference sliding speed as a correction coefficient;

calculating a central value of the correction coefficient; and determining the central value of the correction coefficient as the interface scrolling speed parameter.

In one embodiment, the adjusting a scrolling speed of an interface based on the interface scrolling speed parameter includes:

multiplying the interface scrolling speed parameter by the reference interface scrolling speed to obtain an adjusted interface scrolling speed; and adjusting the scrolling speed of the interface based on the adjusted interface scrolling speed.

In one embodiment, the interface scrolling speed options include an option of identifying an interface scrolling speed by using text and/or an option of identifying an interface scrolling speed by using an interface scrolling effect.

For beneficial effects of all parts of the third aspect, refer to descriptions in the first aspect. Details are not described herein again.

A fourth aspect of this application provides a computer readable storage medium including an instruction, and when the instruction is run on a terminal, the terminal is enabled to perform the method for adjusting an interface scrolling speed.

A fifth aspect of this application provides a computer program product including an instruction, and when the computer program product is run on a terminal, the terminal is enabled to perform the method for adjusting an interface scrolling speed.

In the embodiments of this application, the user operation can be obtained, the interface scrolling speed parameter is determined based on the user operation, and the scrolling speed of the interface is further adjusted based on the interface scrolling speed parameter, so that the user can adjust an interface scrolling speed as required.

DESCRIPTION OF EMBODIMENTS

When a user uses a terminal device including a touchscreen, interface scrolling display may be triggered by performing a sliding operation on the touchscreen or in another manner. In the prior art, there is a fixed association relationship between a sliding speed of the user and a scrolling speed of an interface. In a scrollable interface, when the user slides the touchscreen at a sliding speed, the interface scrolls at an interface scrolling speed, and there is a fixed proportional relationship between the interface scrolling speed and the sliding speed of the user. However, different groups of users have different requirements on an interface scrolling speed. For example, the elderly may feel that the interface scrolling speed is very fast, in other words, interface scrolling sensitivity is very high, but the young may feel that the interface scrolling speed is very slow, in other words, the interface scrolling sensitivity is low. Therefore, in the prior art, there is a technical problem that the interface scrolling speed cannot be adjusted based on a user requirement.

In view of the above, embodiments of this application provide a method for adjusting an interface scrolling speed and a corresponding device, so that an interface scrolling speed parameter can be dynamically adjusted based on a user operation, and a scrolling speed of an interface can be adjusted based on the interface scrolling speed parameter, thereby adjusting an interface scrolling speed based on a user requirement.

Figure 1:
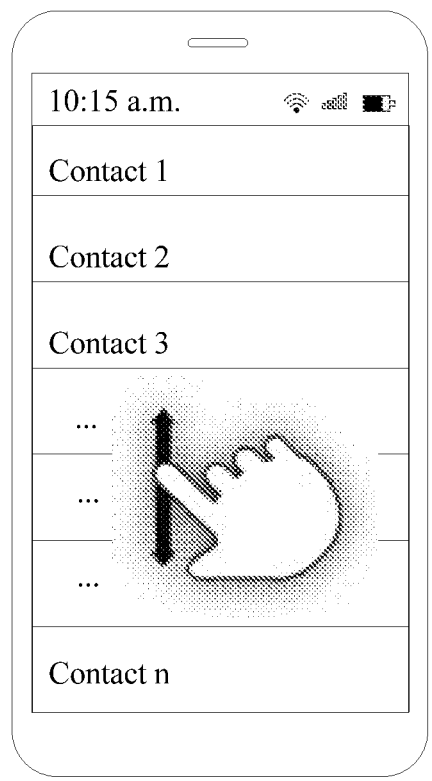
FIG. 1 is a schematic diagram of an application scenario according to an embodiment of this application.
Figure 2:
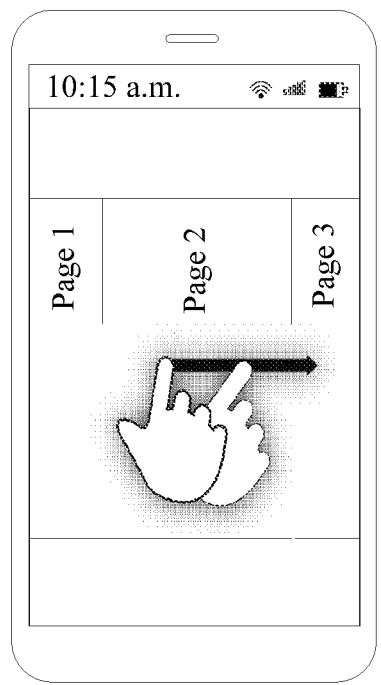
FIG. 2 is a schematic diagram of another application scenario according to an embodiment of this application.

FIG. 1 is a schematic diagram of an application scenario according to an embodiment of this application. For example, an interface displayed in a terminal is a list interface. The list interface is, for example, a contacts list or a conversation list. A contacts list is shown in the figure. A user may trigger scrolling of the list interface through up-and-down sliding on a touchscreen. A scrolling speed of the interface may be adjusted by using the method provided in the embodiments of this application. FIG. 2 is a schematic diagram of another application scenario according to an embodiment of this application. For example, an interface displayed in a terminal is an interface in which a plurality of pages are switched. A user may trigger scrolling of a switching interface through left-and-right sliding on a touchscreen to display different pages. A scrolling speed of the interface may be adjusted by using the method provided in the embodiments of this application. The foregoing descriptions are merely example descriptions of the application scenarios in the embodiments of this application. During actual application, for any interface with a scrolling effect, an interface scrolling speed may be adjusted by using the method provided in the embodiments of this application. A manifestation form of the interface is not limited in the embodiments of this application.

The method for adjusting an interface scrolling speed provided in the embodiments of this application may be applied to a terminal. The terminal may be a smartphone, a tablet computer, an ebook reader, a moving picture experts group audio layer-3 (moving picture experts group audio layer III, MP3) player, a moving picture experts group audio layer-4 (moving picture experts group audio layer IV, MP4) player, a laptop computer, a desktop computer, or the like.

Figure 3:
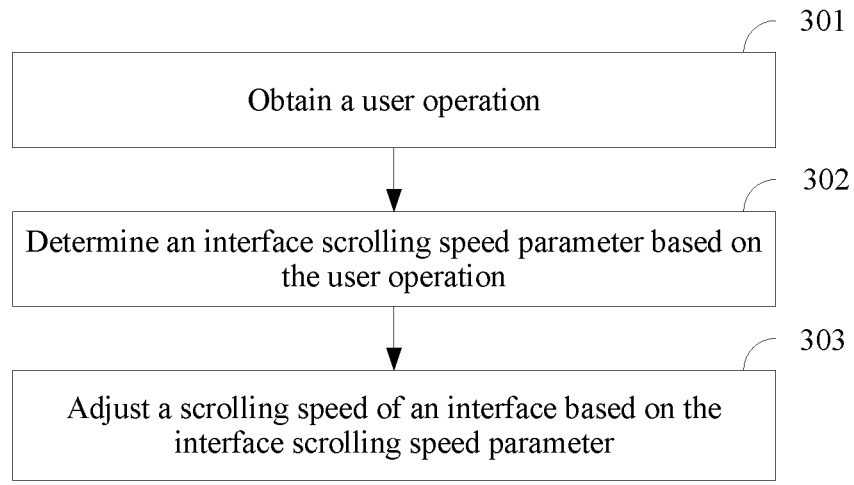
FIG. 3 is a flowchart of an embodiment of a method for adjusting an interface scrolling speed according to embodiments of this application.

FIG. 3 is a flowchart of an embodiment of a method for adjusting an interface scrolling speed according to embodiments of this application. This embodiment may include the following operations.

Operation 301: Obtain a user operation.

In this embodiment of this application, the user operation may be a sliding operation performed on a touchscreen, or may be selection from interface scrolling speed options, or may be a combination of the foregoing two operations. In other words, the user operation may be alternatively a sliding operation performed on a touchscreen after selection from interface scrolling speed options. The user operation may be obtained by detecting a trigger action of a user on the touchscreen.

Operation 302: Determine an interface scrolling speed parameter based on the user operation.

After the user operation is obtained, the interface scrolling speed parameter may be dynamically determined based on the user operation. The interface scrolling speed parameter may be used to determine an interface scrolling speed. For example, when the user operation is the sliding operation performed on the touchscreen, the interface scrolling speed parameter may be determined based on a sliding speed of the sliding operation. When the user operation is the selection from the interface scrolling speed options, the interface scrolling speed parameter may be determined based on an interface scrolling speed option selected by the user. When the user operation is the sliding operation performed on the touchscreen after the selection from the interface scrolling speed options, the interface scrolling speed parameter may be determined based on an interface scrolling speed option selected by the user and a sliding speed of the sliding operation.

Operation 303: Adjust a scrolling speed of an interface based on the interface scrolling speed parameter.

In this embodiment of this application, the user operation can be obtained, the interface scrolling speed parameter is determined based on the user operation, and the scrolling speed of the interface is further adjusted based on the interface scrolling speed parameter, so that the interface scrolling speed parameter and the interface scrolling speed can be adjusted based on the user operation. Further, different users can determine appropriate interface scrolling speeds through different user operations, so that the user can adjust an interface scrolling speed as required.

The following separately describes a process of adjusting an interface scrolling speed through different user operations.

Figure 4:
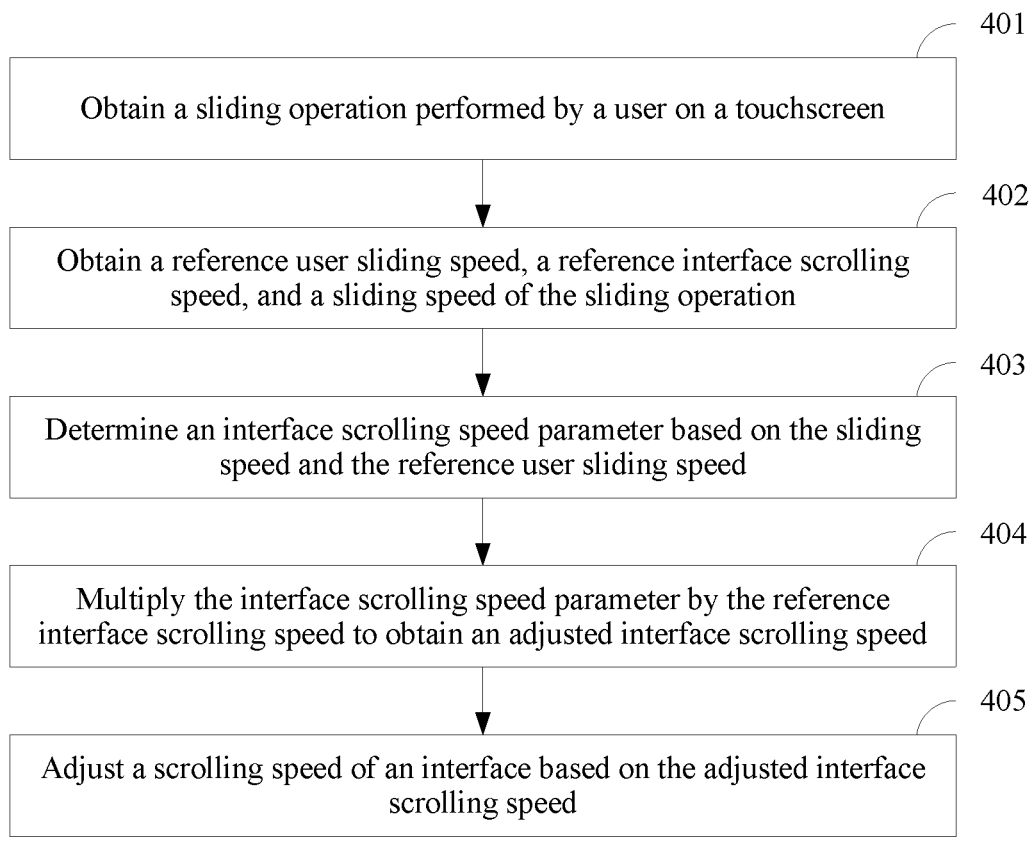
FIG. 4 is a flowchart of another embodiment of a method for adjusting an interface scrolling speed according to embodiments of this application.

FIG. 4 is a flowchart of another embodiment of a method for adjusting an interface scrolling speed according to embodiments of this application. For a first user operation, in one embodiment, when a user operation is a sliding operation performed on a touchscreen, an interface scrolling speed may be adjusted based on a sliding speed of a sliding operation performed by a user. This embodiment may include the following operations.

Operation 401: Obtain a sliding operation performed by a user on a touchscreen.

When the user performs a sliding operation on an interface displayed on the touchscreen to trigger scrolling display of the interface, a terminal may obtain the sliding operation through detection. A sliding direction of the sliding operation is consistent with a scrolling direction of the interface. For example, if the scrolling direction of the interface is an up-and-down direction, the sliding operation of the user performed on the touchscreen should also be in the up-and-down direction. If the scrolling direction of the interface is a left-and-right direction, the sliding operation performed by the user on the touchscreen should also be in the left-and-right direction. It may be understood that, in this embodiment, only a sliding operation performed in a direction consistent with the scrolling direction of the interface may be obtained.

Operation 402: Obtain a reference user sliding speed, a reference interface scrolling speed, and a sliding speed of the sliding operation, where the reference user sliding speed and the reference interface scrolling speed are preset.

When the sliding operation performed by the user on the touchscreen is being obtained, the sliding speed of the sliding operation may be obtained through calculation based on a sliding distance and a sliding time of the sliding operation. The sliding distance is a distance by which the sliding operation performed by the user acts on the touchscreen. The sliding time is a time during which the sliding operation performed by the user acts on the touchscreen. In addition, the preset reference user sliding speed and the preset reference interface scrolling speed may be obtained. The reference user sliding speed may be used as a reference speed for determining whether the sliding speed of the user is relatively fast or relatively slow. In one embodiment, a sliding habit of the user may be determined by comparing the sliding speed of the sliding operation with the reference user sliding speed, to further determine a sliding speed of the interface. For example, when the sliding speed of the sliding operation of the user is greater than the reference user sliding speed, it indicates that the sliding speed of the user is relatively fast. When the sliding speed of the sliding operation of the user is less than the reference user sliding speed, it indicates that the sliding speed of the user is relatively slow. The reference user sliding speed may be preset in an operating system and/or in an application program with an interface scrolling scenario. The reference interface scrolling speed is a reference speed for adjusting an interface scrolling speed. The reference interface scrolling speed may be preset in an operating system and/or an application program with an interface scrolling scenario, so that the sliding speed of the interface is increased or decreased based on the reference interface scrolling speed.

Operation 403: Determine an interface scrolling speed parameter based on the sliding speed and the reference user sliding speed.

In this embodiment of this application, the interface scrolling speed parameter may be determined by comparing the sliding speed with the reference user sliding speed. How to adjust an interface scrolling speed may be further determined based on the interface scrolling speed parameter.

In some implementations of this embodiment of this application, an implementation of determining the interface scrolling speed parameter based on the sliding speed and the reference user sliding speed may include:

determining a ratio of the sliding speed to a reference sliding speed as a correction coefficient, calculating a central value of the correction coefficient, and determining the central value of the correction coefficient as the interface scrolling speed parameter.

The correction coefficient is the ratio of the sliding speed to the reference sliding speed. When the sliding speed is greater than the reference sliding speed, the correction coefficient is greater than 1. When the sliding speed is less than the reference sliding speed, the correction coefficient is less than 1. Because the sliding speed of the user may change in real time, the correction coefficient may vary with the change of the sliding speed, so that a group of correction coefficients is obtained. A central value of this group of correction coefficients may be calculated based on correction coefficients obtained in real time. The central value may be an average value, a median, a mode, or the like. Using the central value of the correction coefficient as the interface scrolling speed parameter can reflect an overall status of the sliding speed of the user, and avoid a case in which a user requirement cannot be truly reflected by adjusting an interface scrolling speed when the sliding speed of the user is very fast or very slow.

Operation 404: Multiply the interface scrolling speed parameter by the reference interface scrolling speed to obtain an adjusted interface scrolling speed.

The interface scrolling speed parameter is multiplied by the reference interface scrolling speed to obtain the adjusted interface scrolling speed. When the central value of the correction coefficient is greater than 1, it indicates that the user is a user that operates a terminal relatively fast, and the sliding speed of the interface may be increased, in other words, the reference interface scrolling speed may be increased. When the central value of the correction coefficient is less than 1, it indicates that the user is a user that operates a terminal relatively slowly, and the sliding speed of the interface may be decreased, in other words, the reference interface scrolling speed may be decreased.

Operation 405: Adjust a scrolling speed of an interface based on the adjusted interface scrolling speed.

In this embodiment of this application, the scrolling speed of the interface may be dynamically adjusted based on the sliding speed of the sliding operation of the user. A type of the user is intelligently identified based on the sliding speed of the user. For example, when the sliding speed of the user is relatively fast overall, the scrolling speed of the interface is increased. When the sliding speed of the user is relatively slow overall, the scrolling speed of the interface is decreased. In this way, a requirement of the user on an interface scrolling speed can be better met.

Figure 5:
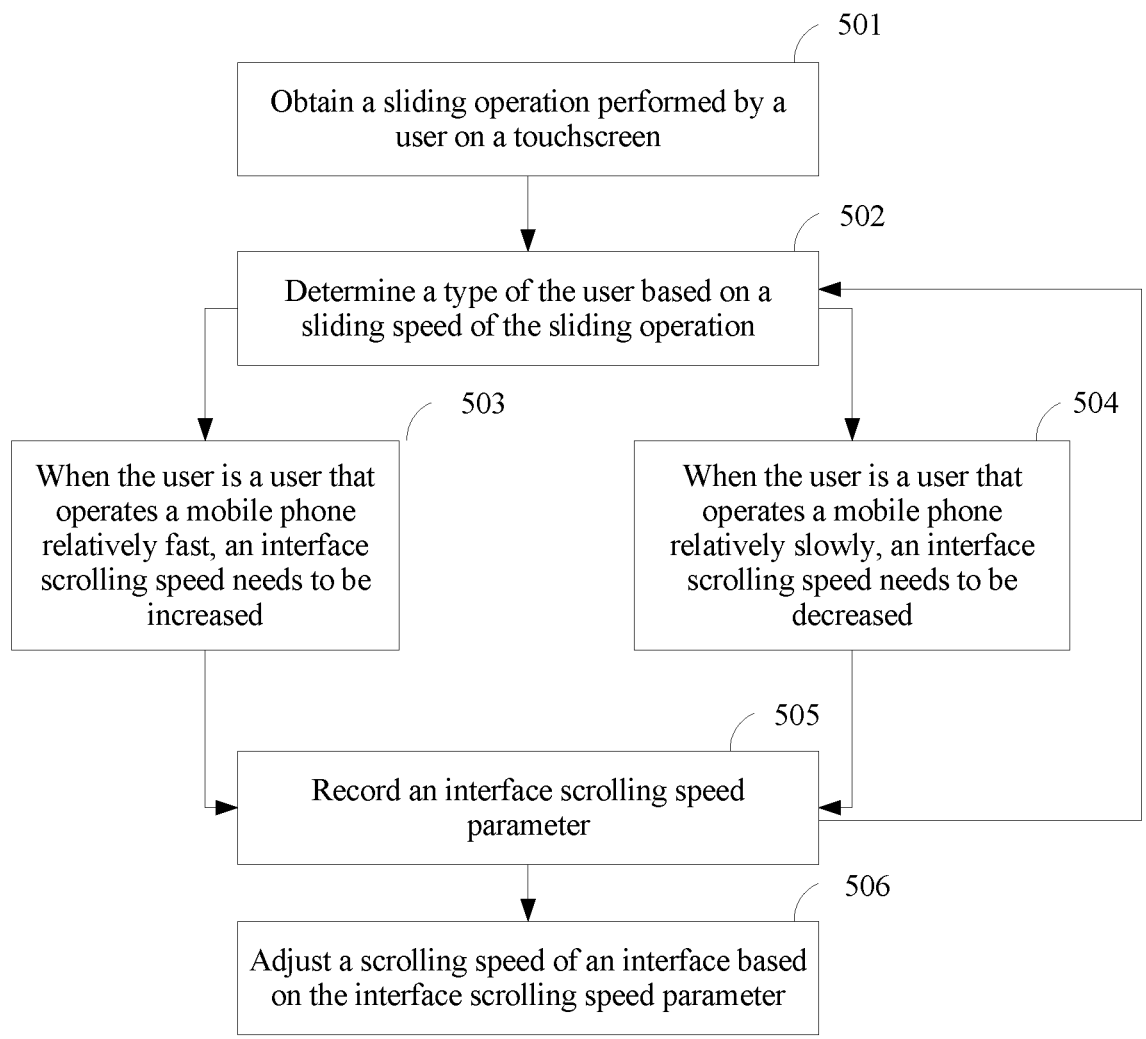
FIG. 5 is a flowchart of another embodiment of a method for adjusting an interface scrolling speed according to embodiments of this application.

FIG. 5 is a flowchart of another embodiment of a method for adjusting an interface scrolling speed according to embodiments of this application. For a first user operation, in one embodiment, when a user operation is a sliding operation performed on a touchscreen, an implementation process in an actual application scenario in which an interface scrolling speed is adjusted based on a sliding speed of a sliding operation performed by a user may include the following operations.

Operation 501: Obtain a sliding operation performed by a user on a touchscreen.

Operation 502: Determine a type of the user based on a sliding speed of the sliding operation.

In this embodiment of this application, a ratio of the sliding speed to a reference sliding speed may be calculated and determined as a correction coefficient, a central value of the correction coefficient is calculated, and the central value of the correction coefficient is determined as an interface scrolling speed parameter. In addition, the type of the user may be determined based on the interface scrolling speed parameter. When the interface scrolling speed parameter is greater than 1, it indicates that the user is a user that operates a terminal relatively fast, and a sliding speed of an interface may be increased. When the interface scrolling speed parameter is less than 1, it indicates that the user is a user that operates a terminal relatively slowly, and a sliding speed of an interface may be decreased. A process of calculating the interface scrolling speed parameter may continue as the sliding operation of the user continues.

Operation 503: When the user is a user that operates a mobile phone relatively fast, an interface scrolling speed needs to be increased.

Operation 504: When the user is a user that operates a mobile phone relatively slowly, an interface scrolling speed needs to be decreased.

Operation 505: Record an interface scrolling speed parameter, go back to operation 502, and proceed to operation 506.

The interface scrolling speed parameter may be recorded in a control for controlling interface scrolling, to adjust the interface scrolling speed during the interface scrolling.

Operation 506: Adjust a scrolling speed of an interface based on the interface scrolling speed parameter.

The interface scrolling speed parameter may be multiplied by a reference interface scrolling speed to obtain an adjusted interface scrolling speed, and the scrolling speed of the interface may be adjusted based on the adjusted interface scrolling speed. In this way, requirements of different users on a list scrolling speed are met.

Figure 6:
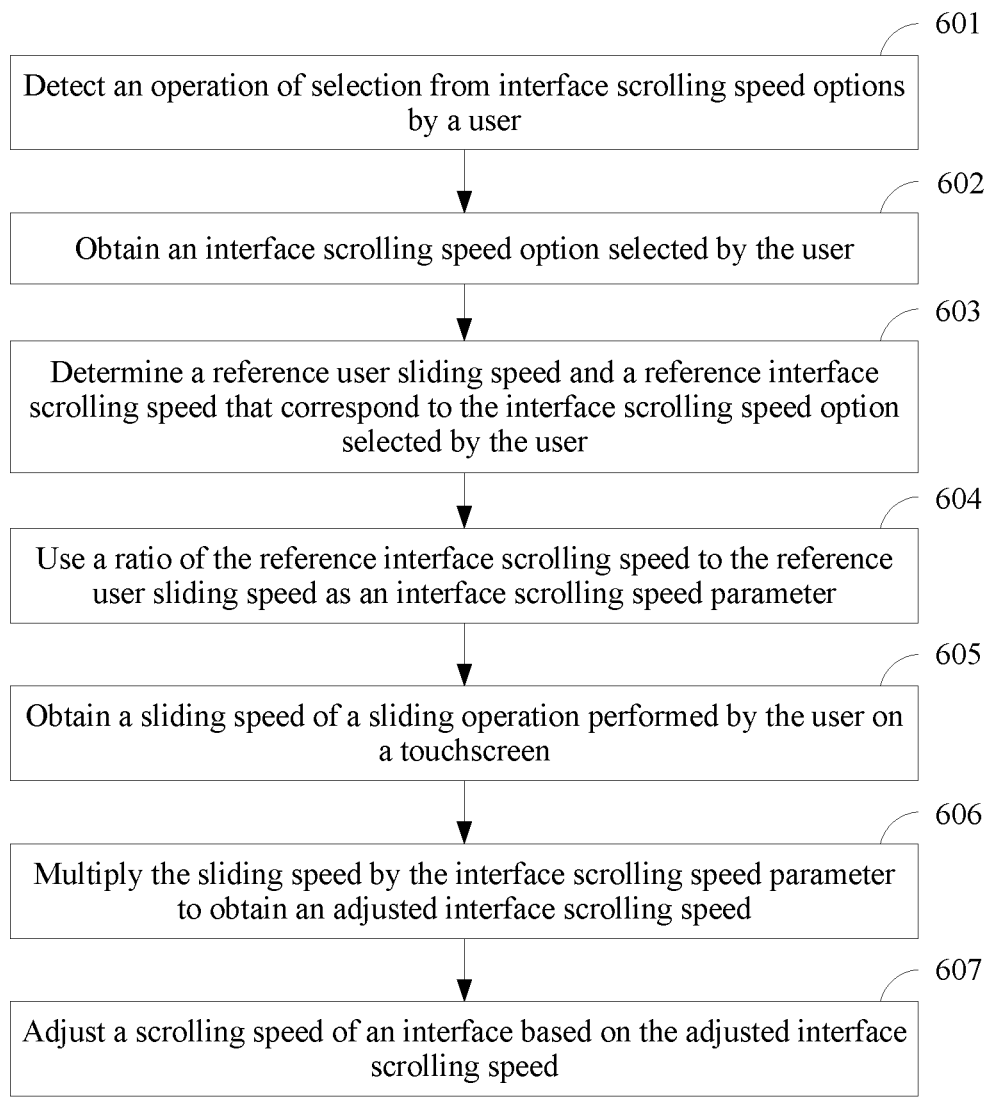
FIG. 6 is a flowchart of another embodiment of a method for adjusting an interface scrolling speed according to embodiments of this application.

FIG. 6 is a flowchart of another embodiment of a method for adjusting an interface scrolling speed according to embodiments of this application. For a second user operation, in one embodiment, when a user operation is selection from interface scrolling speed options, an interface scrolling speed may be adjusted based on selection by a user. This embodiment may include the following operations.

Operation 601: Detect an operation of selection from interface scrolling speed options by a user.

Figure 7:
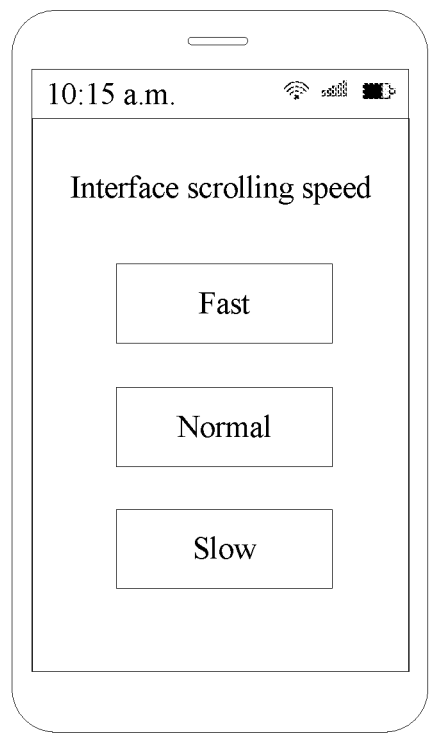
FIG. 7 is a schematic diagram of an interface scrolling speed option according to an embodiment of this application.
Figure 8:
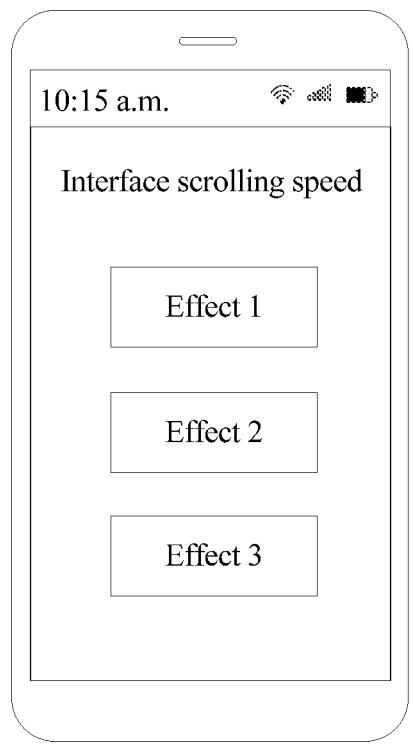
FIG. 8 is another schematic diagram of an interface scrolling speed option according to an embodiment of this application.
Figure 9:
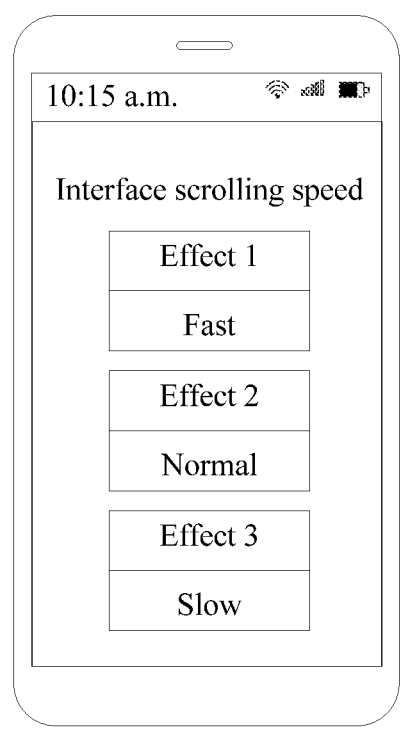
FIG. 9 is another schematic diagram of an interface scrolling speed option according to an embodiment of this application.

In this embodiment of this application, first, a selection interface including a plurality of interface scrolling speed options is provided for the user. The interface scrolling speed option may be an option of identifying an interface scrolling speed by using text, or may be an option of identifying an interface scrolling speed by using an interface scrolling effect, or may be an option of identifying an interface scrolling speed by using text and an interface scrolling effect jointly. FIG. 7 is a schematic diagram of a selection interface including a plurality of interface scrolling speed options according to an embodiment of this application. For example, different interface scrolling speeds are identified by using text options: fast, normal, and slow, for a user to select. The interface scrolling speed options are simple to implement, and the user may directly perform selection as required. FIG. 8 is a schematic diagram of another selection interface including a plurality of interface scrolling speed options according to an embodiment of this application. For example, the interface scrolling speed options may be formed by using different scrolling speed effects. The interface scrolling speed options enable a user to more directly see the scrolling speed effects and to perform selection as required. FIG. 9 is a schematic diagram of another selection interface including a plurality of interface scrolling speed options according to an embodiment of this application. For example, the interface scrolling speed options may be formed by using different scrolling speed effects and corresponding text jointly, so that a user not only can see an interface scrolling speed effect, but also can learn whether a scrolling speed corresponding to the effect is fast, normal, or slow, thereby more accurately completing selection.

After displaying the selection interface including the plurality of interface scrolling speed options, a terminal may detect a trigger operation of the user on any interface scrolling speed option. The trigger operation may be a click operation on any interface scrolling speed option.

Operation 602: Obtain an interface scrolling speed option selected by the user.

Operation 603: Determine a reference user sliding speed and a reference interface scrolling speed that correspond to the interface scrolling speed option selected by the user.

After the user performs a trigger operation on an interface scrolling speed option, the interface scrolling speed option selected by the user may be determined based on a trigger position and a position of each interface scrolling speed option. Each interface scrolling speed option corresponds to a reference user sliding speed and a reference interface scrolling speed in pair. In this embodiment, the reference user sliding speed and the reference interface scrolling speed may be jointly used to determine an interface scrolling speed parameter. The reference user sliding speed and the reference interface scrolling speed in pair that correspond to each interface scrolling speed option may be preset in an operating system and/or an application program with an interface scrolling scenario.

Operation 604: Use a ratio of the reference interface scrolling speed to the reference user sliding speed as an interface scrolling speed parameter.

The ratio of the reference interface scrolling speed to the reference user sliding speed may be used as a scrolling speed parameter. A different interface scrolling speed parameter may be determined based on the option selected by the user. A value of the scrolling speed parameter may be used to determine whether to increase or decrease the reference interface scrolling speed. For example, an interface scrolling speed parameter obtained when the user selects a fast interface scrolling speed is greater than an interface scrolling speed parameter obtained when the user selects a slow interface scrolling speed.

The interface scrolling speed parameter may be recorded in a control for controlling interface scrolling, to adjust the interface scrolling speed during the interface scrolling.

Operation 605: Obtain a sliding speed of a sliding operation performed by the user on a touchscreen.

After the interface scrolling speed parameter is determined, when the user performs a sliding operation on an interface that needs to be scrolled, the interface scrolling speed may be adjusted based on the interface scrolling speed parameter. When the user performs a sliding operation on an interface displayed on the touchscreen to trigger scrolling display of the interface, the terminal may obtain the sliding operation through detection. A sliding direction of the sliding operation is consistent with a scrolling direction of the interface. When the sliding operation performed by the user on the touchscreen is being obtained, the sliding speed of the sliding operation may be obtained through calculation based on a sliding distance and a sliding time of the sliding operation.

Operation 606: Multiply the sliding speed by the interface scrolling speed parameter to obtain an adjusted interface scrolling speed.

The ratio of the reference interface scrolling speed to the reference user sliding speed may be the same as a ratio of the adjusted interface scrolling speed to the sliding speed, and the ratio of the reference interface scrolling speed to the reference user sliding speed is the interface scrolling speed parameter. Therefore, the adjusted interface scrolling speed may be obtained by multiplying the sliding speed by the interface scrolling speed parameter.

Operation 607: Adjust a scrolling speed of an interface based on the adjusted interface scrolling speed.

In this embodiment of this application, the user may select the interface scrolling speed option based on a requirement on the scrolling speed of the interface, and the interface scrolling speed is then determined based on the interface scrolling speed option selected by the user. For example, when the user chooses to scroll the interface at a relatively fast speed, the scrolling speed of the interface is increased. When the user chooses to scroll the interface at a relatively slow speed, the scrolling speed of the interface is decreased. In this way, the requirement of the user on the interface scrolling speed can be better met.

Figure 10:
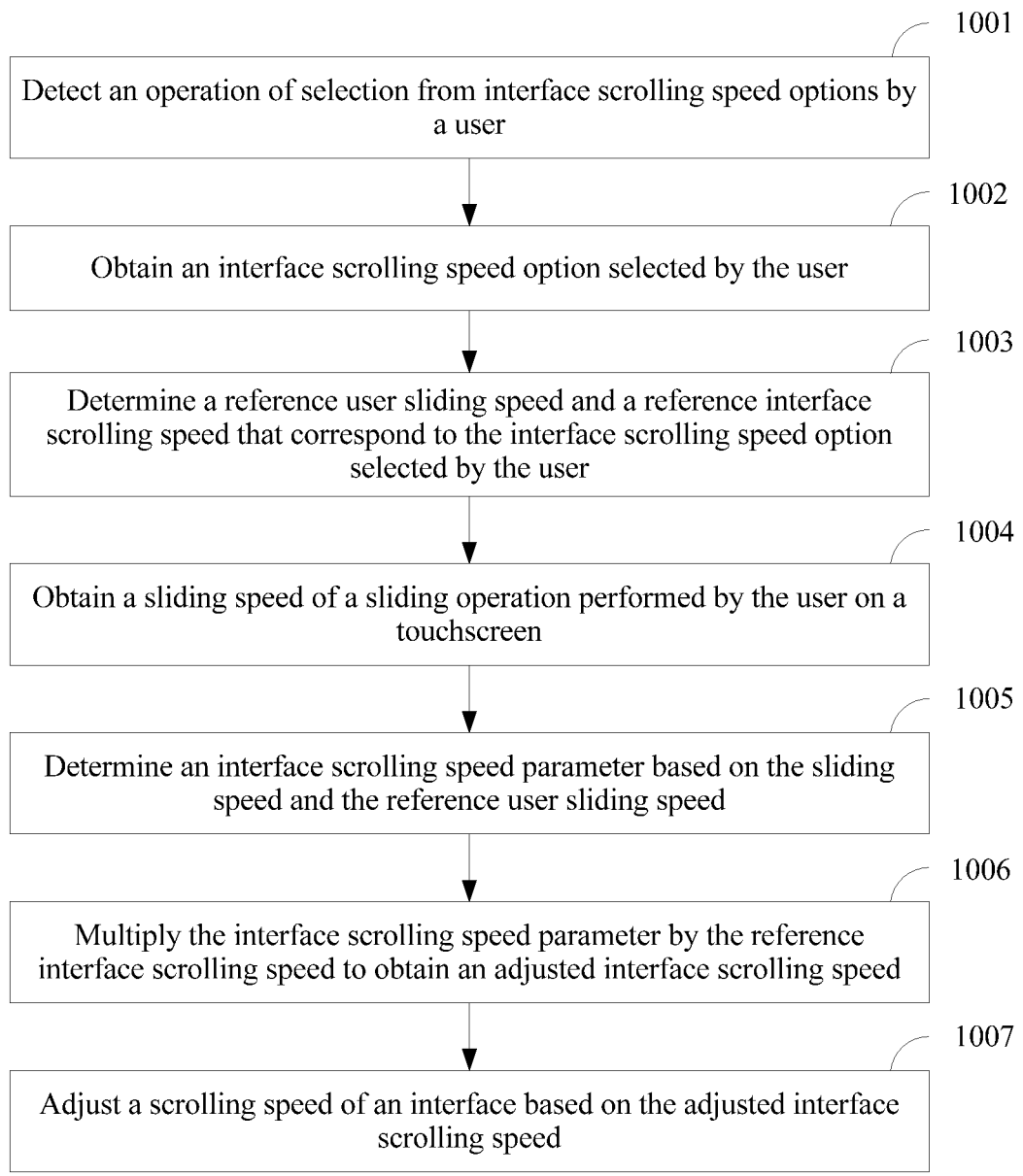
FIG. 10 is a flowchart of another embodiment of a method for adjusting an interface scrolling speed according to embodiments of this application.

FIG. 10 is a flowchart of another embodiment of a method for adjusting an interface scrolling speed according to embodiments of this application. For a third user operation, in one embodiment, when a user operation is a sliding operation performed on a touchscreen after selection from interface scrolling speed options, a reference user sliding speed and a reference interface scrolling speed may be determined based on selection by a user, and then a final interface scrolling speed is determined based on a sliding speed of a sliding operation of the user. This embodiment may include the following operations.

Operation 1001: Detect an operation of selection from interface scrolling speed options by a user.

In this embodiment of this application, first, a selection interface including a plurality of interface scrolling speed options is provided for the user. The interface scrolling speed option may be an option of identifying an interface scrolling speed by using text, or may be an option of identifying an interface scrolling speed by using an interface scrolling effect, or may be an option of identifying an interface scrolling speed by using text and an interface scrolling effect jointly. FIG. 7 is a schematic diagram of a selection interface including a plurality of interface scrolling speed options according to an embodiment of this application. For example, different interface scrolling speeds are identified by using text options: fast, normal, and slow, for a user to select. The interface scrolling speed options are simple to implement, and the user may directly perform selection as required. FIG. 8 is a schematic diagram of another selection interface including a plurality of interface scrolling speed options according to an embodiment of this application. For example, the interface scrolling speed options may be formed by using different scrolling speed effects. The interface scrolling speed options enable a user to more directly see the scrolling speed effects and to perform selection as required. FIG. 9 is a schematic diagram of another selection interface including a plurality of interface scrolling speed options according to an embodiment of this application. For example, the interface scrolling speed options may be formed by using different scrolling speed effects and corresponding text jointly, so that a user not only can see an interface scrolling speed effect, but also can learn whether a scrolling speed corresponding to the effect is fast, normal, or slow, thereby more accurately completing selection.

After displaying the selection interface including the plurality of interface scrolling speed options, a terminal may detect a trigger operation of the user on any interface scrolling speed option. The trigger operation may be a click operation on any interface scrolling speed option.

Operation 1002: Obtain an interface scrolling speed option selected by the user.

Operation 1003: Determine a reference user sliding speed and a reference interface scrolling speed that correspond to the interface scrolling speed option selected by the user.

After the user performs a trigger operation on an interface scrolling speed option, the interface scrolling speed option selected by the user may be determined based on a trigger position and a position of each interface scrolling speed option. Each interface scrolling speed option corresponds to a reference user sliding speed and a reference interface scrolling speed in pair. For example, if the user selects a fast interface scrolling speed, the reference user sliding speed and the reference interface scrolling speed may be relatively fast. If the user selects a slow interface scrolling speed, the reference user sliding speed and the reference interface scrolling speed may be relatively slow. In addition, a proportion of the reference user sliding speed to the reference interface scrolling speed when the user selects the fast interface scrolling speed is greater than a proportion of the reference user sliding speed to the reference interface scrolling speed when the user selects the slow interface scrolling speed.

The reference user sliding speed and the reference interface scrolling speed in pair that correspond to each interface scrolling speed option may be preset in an operating system and/or an application program with an interface scrolling scenario.

After the user performs the selection, the scrolling speed may be further adjusted based on a sliding operation of the user. In this case, the reference user sliding speed may be used as a reference speed for determining whether a sliding speed of the user is relatively fast or relatively slow, and the reference interface scrolling speed is a reference speed for adjusting an interface scrolling speed. For example, if the sliding speed of the user is faster than a selected reference user sliding speed, a scrolling speed of an interface is further increased. If the sliding speed of the user is slower than a selected reference user sliding speed, a scrolling speed of an interface is appropriately decreased, so that an actual scrolling speed of the interface can better meet a user requirement based on the selection by the user.

Operation 1004: Obtain a sliding speed of a sliding operation performed by the user on a touchscreen.

After the reference user sliding speed and the reference interface scrolling speed are determined, when the user performs a sliding operation on an interface that needs to be scrolled, the sliding operation may be obtained through detection. A sliding direction of the sliding operation is consistent with a scrolling direction of the interface. When the sliding operation performed by the user on the touchscreen is being obtained, the sliding speed of the sliding operation may be obtained through calculation based on a sliding distance and a sliding time of the sliding operation.

Operation 1005: Determine an interface scrolling speed parameter based on the sliding speed and the reference user sliding speed.

In this embodiment of this application, the interface scrolling speed parameter may be determined by comparing the sliding speed with the reference user sliding speed. How to adjust an interface scrolling speed may be further determined based on the interface scrolling speed parameter.

In some implementations of this embodiment of this application, an implementation of determining the interface scrolling speed parameter based on the sliding speed and the reference user sliding speed may include:

determining a ratio of the sliding speed to a reference sliding speed as a correction coefficient, calculating a central value of the correction coefficient, and determining the central value of the correction coefficient as the interface scrolling speed parameter.

The correction coefficient is the ratio of the sliding speed to the reference sliding speed. When the sliding speed is greater than the reference sliding speed, the correction coefficient is greater than 1. When the sliding speed is less than the reference sliding speed, the correction coefficient is less than 1. Because the sliding speed of the user may change in real time, the correction coefficient may vary with the change of the sliding speed, so that a group of correction coefficients is obtained. A central value of this group of correction coefficients may be calculated based on correction coefficients obtained in real time. The central value may be an average value, a median, a mode, or the like. Using the central value of the correction coefficient as the interface scrolling speed parameter can reflect an overall status of the sliding speed of the user, and avoid a case in which a user requirement cannot be truly reflected by adjusting an interface scrolling speed when the sliding speed of the user is very fast or very slow.

The interface scrolling speed parameter may be recorded in a control for controlling interface scrolling, to adjust the interface scrolling speed during the interface scrolling.

Operation 1006: Multiply the interface scrolling speed parameter by the reference interface scrolling speed to obtain an adjusted interface scrolling speed.

The interface scrolling speed parameter is multiplied by the reference interface scrolling speed to obtain the adjusted interface scrolling speed. When the central value of the correction coefficient is greater than 1, it indicates that a sliding speed of the interface may be further increased, in other words, the reference interface scrolling speed may be increased. When the central value of the correction coefficient is less than 1, it indicates that a sliding speed of the interface needs to be decreased, in other words, the reference interface scrolling speed may be decreased.

Operation 1007: Adjust a scrolling speed of an interface based on the adjusted interface scrolling speed.

In this embodiment of this application, the user may select an interface scrolling speed option based on a requirement on the scrolling speed of the interface. After the user performs the selection, the scrolling speed may be further adjusted based on a sliding operation of the user, to better meet the requirement of the user on the interface scrolling speed.

The embodiments of the method for adjusting an interface scrolling speed provided in the embodiments of this application are described by using the foregoing embodiments. The embodiments of the method for adjusting an interface scrolling speed provided in the embodiments of this application may be applied to operating system software, or may be applied to application program software. In one embodiment, a same interface scrolling speed may be set for an operating system and each application program, or different interface scrolling speeds may be set for different application programs and different scenarios.

In addition, when an interface scrolling speed is adjusted by using the method in the embodiments of this application, a user may be further notified that the interface scrolling speed is being dynamically adjusted currently. In addition, the user may alternatively choose not to use the method in the embodiments of this application, but use only a fixed program scrolling speed.

Figure 11:
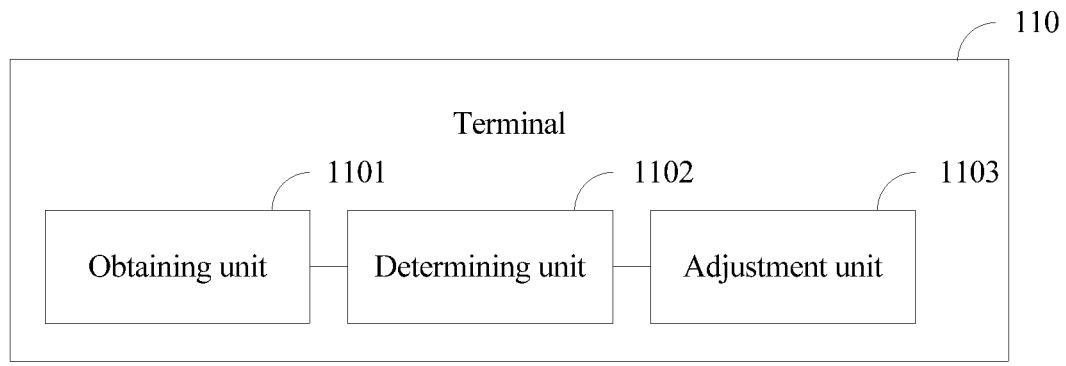
FIG. 11 is a schematic diagram of an embodiment of a terminal according to embodiments of this application.

FIG. 11 shows an embodiment of a terminal 110 according to embodiments of this application. The terminal may include:

an obtaining unit 1101, configured to obtain a user operation;

a determining unit 1102, configured to determine an interface scrolling speed parameter based on the user operation; and an adjustment unit 1103, configured to adjust a scrolling speed of an interface based on the interface scrolling speed parameter.

In one embodiment, when the user operation may be a sliding operation performed by a user on a touchscreen, the determining unit 1102 may be configured to:

obtain a reference user sliding speed, a reference interface scrolling speed, and a sliding speed of the sliding operation, where the reference user sliding speed and the reference interface scrolling speed are preset; and determine the interface scrolling speed parameter based on the sliding speed and the reference user sliding speed.

In one embodiment, the determining the interface scrolling speed parameter based on the sliding speed and the reference user sliding speed may include: determining a ratio of the sliding speed to a reference sliding speed as a correction coefficient, calculating a central value of the correction coefficient, and determining the central value of the correction coefficient as the interface scrolling speed parameter. In other words, the determining unit may be further configured to: determine the ratio of the sliding speed to the reference sliding speed as the correction coefficient, calculate the central value of the correction coefficient, and determine the central value of the correction coefficient as the interface scrolling speed parameter.

In one embodiment, when the user operation is selection from interface scrolling speed options, the determining unit 1102 may be configured to:

obtain an interface scrolling speed option selected by a user; and determine a reference user sliding speed and a reference interface scrolling speed that correspond to the interface scrolling speed option selected by the user, and use a ratio of the reference interface scrolling speed to the reference user sliding speed as the interface scrolling speed parameter.

In one embodiment, when the user operation is selection from interface scrolling speed options, the adjustment unit 1103 may be configured to:

obtain a sliding speed of a sliding operation performed by the user on a touchscreen;

multiply the sliding speed by the interface scrolling speed parameter to obtain an adjusted interface scrolling speed; and adjust the scrolling speed of the interface based on the adjusted interface scrolling speed.

In one embodiment, the user operation is a sliding operation performed on a touchscreen after selection from interface scrolling speed options, and the determining unit 1102 may be configured to:

obtain an interface scrolling speed option selected by a user;

determine a reference user sliding speed and a reference interface scrolling speed that correspond to the interface scrolling speed option selected by the user;

obtain a sliding speed of the sliding operation; and determine the interface scrolling speed parameter based on the sliding speed and the reference user sliding speed.

In one embodiment, the determining the interface scrolling speed parameter based on the sliding speed and the reference user sliding speed may include: determining a ratio of the sliding speed to a reference sliding speed as a correction coefficient, calculating a central value of the correction coefficient, and determining the central value of the correction coefficient as the interface scrolling speed parameter. In other words, the determining unit may be further configured to: determine the ratio of the sliding speed to the reference sliding speed as the correction coefficient, calculate the central value of the correction coefficient, and determine the central value of the correction coefficient as the interface scrolling speed parameter.

In one embodiment, the user operation is a sliding operation performed on a touchscreen after selection from interface scrolling speed options, and the adjustment unit 1103 may be configured to:

multiply the interface scrolling speed parameter by the reference interface scrolling speed to obtain an adjusted interface scrolling speed; and adjust the scrolling speed of the interface based on the adjusted interface scrolling speed.

In one embodiment, the interface scrolling speed options may include an option of identifying an interface scrolling speed by using text and/or an option of identifying an interface scrolling speed by using an interface scrolling effect.

In this embodiment, for related functions implemented by the obtaining unit 1101, the determining unit 1102, and the adjustment unit 1103, refer to descriptions in the embodiments of the method for adjusting an interface scrolling speed for understanding. Details are not described herein again.

In this embodiment of this application, the user operation can be obtained, the interface scrolling speed parameter is determined based on the user operation, and the scrolling speed of the interface is further adjusted based on the interface scrolling speed parameter, so that the user can adjust an interface scrolling speed as required.

Figure 12:
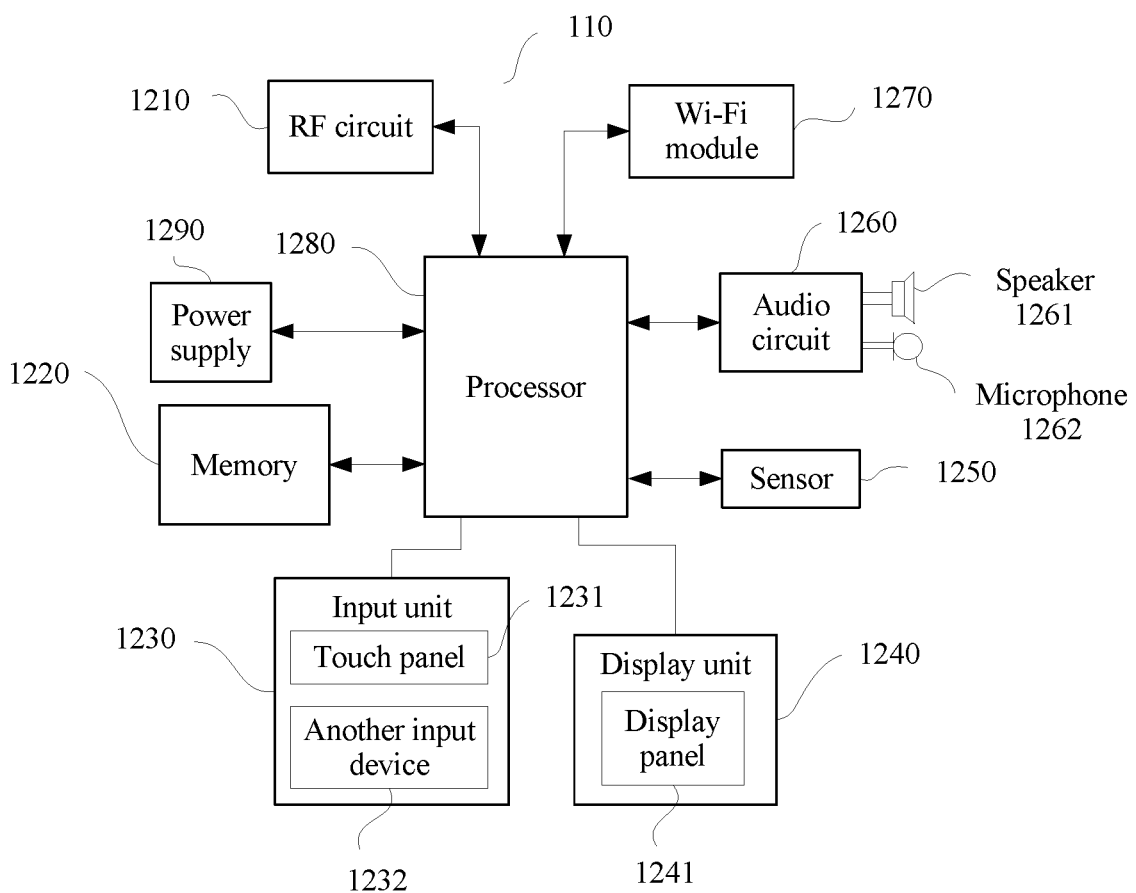
FIG. 12 is a schematic diagram of another embodiment of a terminal according to embodiments of this application.

FIG. 12 is a block diagram of a partial structure of the terminal 110 according to the embodiments of the invention. Referring to FIG. 12, the terminal includes components such as a radio frequency (RF) circuit 1210, a memory 1220, an input unit 1230, a display unit 1240, a sensor 1250, an audio circuit 1260, a Wi-Fi module 1270, a processor 1280, and a power supply 1290. It may be understood by persons skilled in the art that, the terminal structure shown in FIG. 12 does not constitute any limitation on the terminal, and the terminal may include more or fewer components than those shown in the figure, or combine some components, or have different component arrangements.

The components of the terminal are described below with reference to FIG. 12.

The RF circuit 1210 may be configured to transmit or receive data.

The memory 1220 may be configured to store a software program and a module. The processor 1280 runs the software program and the module stored in the memory 1220, to perform various function applications of the terminal and data processing. The memory 1220 may mainly include a program storage area and a data storage area. The program storage area may store an operating system, an application program required by at least one function (such as a sound play function and an image play function), and the like. The data storage area may store data (such as audio data or a phone book) created based on use of the terminal, and the like. In addition, the memory 1220 may include a high-speed random access memory, and may further include a non-volatile memory, such as at least one magnetic disk storage device, a flash memory device, or another volatile solid-state storage device.

The input unit 1230 may be configured to: receive an operation instruction of a user, and generate a key signal input related to a user setting and function control of the terminal 110. In one embodiment, the input unit 1230 may include a touch panel 1231 and another input device 1232. The touch panel 1231, also be referred to as a touchscreen, may collect a touch or non-touch operation or a touch operation of the user on or near the touch panel 1231 (such as an operation of the user on or near the touch panel 1231 by using any appropriate object or accessory such as a finger or a stylus), and drive a corresponding connection terminal based on a preset program. In one embodiment, the touch panel 1231 may include two parts: a touch detection terminal and a touch controller. The touch detection terminal detects a touch position of the user, detects a signal generated by the touch operation, and transfers the signal to the touch controller. The touch controller receives touch information from the touch detection terminal, converts the touch information into touch point coordinates, and then sends the touch point coordinates to the processor 1280. In addition, the touch controller can receive and execute a command sent by the processor 1280. In addition, the touch panel 1231 may be implemented by using a plurality of types such as a resistive type, a capacitive type, an infrared ray, and a surface acoustic wave. In one embodiment, the input unit 1230 may further include the another input device 1232. The another input device 1232 may include but is not limited to one or more of a physical keyboard, a function button (such as a volume control button or a power button), a trackball, a mouse, and a joystick.

The display unit 1240 may be configured to display an interface. The display unit 1240 may include a display panel 1241. In one embodiment, the display panel 1241 may be configured in a form of a liquid crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280 to determine a type of a touch event. Subsequently, the processor 1280 provides a corresponding visual output on the display panel 1241 based on the type of the touch event. Although in FIG. 12, the touch panel 1231 and the display panel 1241 are used as two independent components to implement input and input functions of the terminal, in some embodiments, the touch panel 1231 and the display panel 1241 may be integrated to implement the input and output functions of the terminal.

The terminal 110 may further include at least one sensor 1250.

The audio circuit 1260, a speaker 1261, and a microphone 1262 may provide an audio interface between the user and the terminal. The audio circuit 1260 may convert received audio data into an electrical signal and transmit the electrical signal to the speaker 1261. The speaker 1261 converts the electrical signal into a sound signal for output. In addition, the microphone 1262 converts a collected sound signal into an electrical signal. The audio circuit 1260 receives the electrical signal, converts the electrical signal into audio data, and then outputs the audio data to the processor 1280. The processor 1280 processes the audio data and then sends the processed audio data to, for example, another terminal through the camera 1210, or outputs the processed audio data to the memory 1220 for further processing.

The Wi-Fi module 1270 may be configured to perform communication.

The processor 1280 is a control center of the terminal, and connects all parts of the entire terminal by using various interfaces and lines. By running or executing a software program and/or a module stored in the memory 1220 and invoking data stored in the memory 1220, the processor 1280 performs various functions of the terminal and data processing, to perform overall monitoring on the terminal. In one embodiment, the processor 1280 may include one or more processing units. Preferably, the processor 1280 may integrate an application processor and a modem processor. The application processor mainly processes an operating system, a user interface, an application program, and the like. The modem processor mainly processes wireless communication. It may be understood that, the modem processor may not be integrated into the processor 1280. In one embodiment, the processor 1280 may further include a function module such as a display control module.

The terminal 110 further includes a power supply 1290 (such as a battery) for supplying power to each component. Preferably, the power supply may be logically connected to the processor 1280 by using a power supply management system, thereby implementing functions such as charging, discharging, and power consumption management by using the power supply management system.

Although not shown, the terminal 110 may further include a camera, a Bluetooth module, and the like. Details are not described herein.

In this embodiment of the invention, the processor 1280 included in the terminal further has the following functions:

obtaining a user operation by using the input unit;

determining an interface scrolling speed parameter based on the user operation; and adjusting, based on the interface scrolling speed parameter, a scrolling speed of an interface displayed by the display unit.

In one embodiment, the user operation is a sliding operation performed by the user on the touchscreen, and the determining an interface scrolling speed parameter based on the user operation may include:

obtaining a reference user sliding speed and a reference interface scrolling speed, and obtaining a sliding speed of the sliding operation by using the input unit, where the reference user sliding speed and the reference interface scrolling speed are preset; and determining the interface scrolling speed parameter based on the sliding speed and the reference user sliding speed.

In one embodiment, the user operation is selection from interface scrolling speed options, and the determining an interface scrolling speed parameter based on the user operation includes:

obtaining, by using the input unit, an interface scrolling speed option selected by the user;

determining a reference user sliding speed and a reference interface scrolling speed that correspond to the interface scrolling speed option selected by the user;

using a ratio of the reference interface scrolling speed to the reference user sliding speed as the interface scrolling speed parameter.

In one embodiment, the adjusting a scrolling speed of an interface based on the interface scrolling speed parameter includes:

obtaining, by using the input unit, a sliding speed of a sliding operation performed by the user on the touchscreen;

multiplying the sliding speed by the interface scrolling speed parameter to obtain an adjusted interface scrolling speed; and adjusting, based on the adjusted interface scrolling speed, the scrolling speed of the interface displayed by the display unit.

In one embodiment, the user operation is a sliding operation performed on the touchscreen after selection from interface scrolling speed options, and the determining an interface scrolling speed parameter based on the user operation includes:

obtaining, by using the input unit, an interface scrolling speed option selected by the user;

determining a reference user sliding speed and a reference interface scrolling speed that correspond to the interface scrolling speed option selected by the user;

obtaining a sliding speed of the sliding operation by using the input unit; and determining the interface scrolling speed parameter based on the sliding speed and the reference user sliding speed.

In one embodiment, the determining the interface scrolling speed parameter based on the sliding speed and the reference user sliding speed includes:

determining a ratio of the sliding speed to a reference sliding speed as a correction coefficient;

calculating a central value of the correction coefficient; and determining the central value of the correction coefficient as the interface scrolling speed parameter.

In one embodiment, the adjusting a scrolling speed of an interface based on the interface scrolling speed parameter includes:

multiplying the interface scrolling speed parameter by the reference interface scrolling speed to obtain an adjusted interface scrolling speed; and adjusting, based on the adjusted interface scrolling speed, the scrolling speed of the interface displayed by the display unit.

In one embodiment, the interface scrolling speed options displayed by the display unit may include an option of identifying an interface scrolling speed by using text and/or an option of identifying an interface scrolling speed by using an interface scrolling effect.

With reference to FIG. 11 and FIG. 12, the obtaining unit 1101 in the terminal 110 may be implemented by the input unit 1230 and/or the processor 1280; the determining unit 1102 may be implemented by the processor 1280, or may be implemented by the input unit 1230 and the processor 1280; and the adjustment unit 1103 may be implemented by the processor 1280, or may be implemented by the processor 1280 and the display unit 1240, or may be implemented by the input unit 1230, the display unit 1240, and the processor 1280.

In this embodiment, for related descriptions of the terminal 110, refer to descriptions in the embodiments of the method for adjusting an interface scrolling speed for understanding. Details are not described herein again.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired manner (for example, by using a coaxial cable, an optical fiber, or a digital subscriber line (DSL)) or in a wireless (for example, infrared, radio, and microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

An embodiment of this application further provides a computer readable storage medium including an instruction. When the instruction is run on a terminal, the terminal may be enabled to perform the method for adjusting an interface scrolling speed provided in the embodiments of this application.

An embodiment of this application further provides a computer program product including an instruction. When the computer program product is run on a terminal, the terminal may be enabled to perform the method for adjusting an interface scrolling speed provided in the embodiments of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for adjusting an interface scrolling speed comprising:
   obtaining a sliding operation performed by a user on a touchscreen;
   determining a type of the user based on a sliding speed of the sliding operation;
   increasing an interface scrolling speed, when the type of the user is a user that operates a mobile phone fast;
   decreasing the interface scrolling speed, when the type of the user is a user that operates the mobile phone slowly;
   recording an interface scrolling speed parameter; and
   adjusting a scrolling speed of an interface based on the interface scrolling speed parameter.

2. The method according to claim 1, wherein the determining a type of the user based on a sliding speed of the sliding operation comprises:
   calculating a ratio of the sliding speed to a reference sliding speed;
   determining the ratio as a correction coefficient;
   calculating a central value of the correction coefficient; and
   determining the central value of the correction coefficient as the interface scrolling speed parameter.

3. The method according to claim 1, wherein the determining the type of the user based on a sliding speed of the sliding operation comprises:
   determining the type of the user as a user that operates a mobile phone fast, when the interface scrolling speed parameter is greater than a preset parameter;
   determining the type of the user as a user that operates a mobile phone slowly, when the interface scrolling speed parameter is less than the preset parameter; and
   continuing a process of calculating the interface scrolling speed parameter as the sliding operation of the user continues.

4. The method according to claim 1, wherein the adjusting a scrolling speed of an interface based on the interface scrolling speed parameter comprises:
   multiplying the interface scrolling speed parameter by a reference interface scrolling speed for adjusting the scrolling speed of the interface.

5. A terminal including a touchscreen comprising:
   a processor; and
   a memory, wherein the memory stores a computer instruction, and when the computer instruction in the memory is executed, the processor is configured to perform the following operations:
   obtaining a sliding operation performed by a user on the touchscreen;
   determining a type of the user based on a sliding speed of the sliding operation;
   increasing an interface scrolling speed, when the type of the user is a user that operates a mobile phone fast;
   decreasing the interface scrolling speed, when the type of the user is a user that operates the mobile phone slowly;
   recording an interface scrolling speed parameter; and
   adjusting a scrolling speed of an interface based on the interface scrolling speed parameter.

6. The terminal according to claim 5, wherein the determining a type of the user based on a sliding speed of the sliding operation comprises:
   calculating a ratio of the sliding speed to a reference sliding speed;
   determining the ratio as a correction coefficient;
   calculating a central value of the correction coefficient;
   determining the central value of the correction coefficient as the interface scrolling speed parameter.

7. The terminal according to claim 6, wherein the determining a type of the user based on a sliding speed of the sliding operation comprises:
   determining the type of the user as a user that operates a mobile phone fast, when the interface scrolling speed parameter is greater than a preset parameter;
   determining the type of the user as a user that operates a mobile phone slowly, when the interface scrolling speed parameter is less than the preset parameter; and
   continuing a process of calculating the interface scrolling speed parameter as the sliding operation of the user continues.

8. The terminal according to claim 5, wherein the adjusting a scrolling speed of an interface based on the interface scrolling speed parameter comprises:
   multiplying the interface scrolling speed parameter by a reference interface scrolling speed for adjusting the scrolling speed of the interface.

9. A non-transitory computer-readable medium having computer instructions stored therein, which when executed by a processor, cause the processor to perform a method comprising:
   obtaining a sliding operation performed by a user on a touchscreen;
   determining a type of the user based on a sliding speed of the sliding operation;
   increasing an interface scrolling speed, when the type of the user is a user that operates a mobile phone fast;
   decreasing the interface scrolling speed, when the type of the user is a user that operates the mobile phone slowly;
   recording an interface scrolling speed parameter; and
   adjusting a scrolling speed of an interface based on the interface scrolling speed parameter.

10. The non-transitory computer-readable medium according to claim 9, wherein the determining a type of the user based on a sliding speed of the sliding operation comprises:

calculating a ratio of the sliding speed to a reference sliding speed;
determining the ratio as a correction coefficient;
calculating a central value of the correction coefficient;
determining the central value of the correction coefficient as the interface scrolling speed parameter.

11. The non-transitory computer-readable medium according to claim 10, wherein the determining a type of the user based on a sliding speed of the sliding operation comprises:
determining the type of the user as a user that operates a mobile phone fast, when the interface scrolling speed parameter is greater than a preset parameter;
determining the type of the user as a user that operates a mobile phone slowly, when the interface scrolling speed parameter is less than the preset parameter; and
continuing a process of calculating the interface scrolling speed parameter as the sliding operation of the user continues.

12. The non-transitory computer-readable medium according to claim 9, wherein the adjusting a scrolling speed of an interface based on the interface scrolling speed parameter comprises:
multiplying the interface scrolling speed parameter by a reference interface scrolling speed for adjusting the scrolling speed of the interface.

* * * * *